(12) United States Patent
Bent

(10) Patent No.: US 6,814,579 B2
(45) Date of Patent: Nov. 9, 2004

(54) METHOD FOR EDUCATING CHILDREN

(76) Inventor: Kim Suzanne Bent, P.O. Box 876, Marlborough, MA (US) 01752

( * ) Notice: Subject to any disclaimer, the term of this patent is extended or adjusted under 35 U.S.C. 154(b) by 0 days.

(21) Appl. No.: 10/679,142

(22) Filed: Oct. 3, 2003

(65) Prior Publication Data

US 2004/0081950 A1 Apr. 29, 2004

Related U.S. Application Data

(63) Continuation of application No. 09/694,920, filed on Oct. 24, 2000, now abandoned.
(60) Provisional application No. 60/162,415, filed on Oct. 27, 1999.

(51) Int. Cl.[7] .............................................. G09B 19/00
(52) U.S. Cl. ......................... 434/433; 434/170; 434/207
(58) Field of Search ................................ 434/156, 162, 434/167, 170, 178, 188, 207, 267, 365, 373, 433

(56) References Cited

U.S. PATENT DOCUMENTS

| | | | | | |
|---|---|---|---|---|---|
| 3,724,101 | A | * | 4/1973 | Slezak | 434/170 |
| 3,758,995 | A | * | 9/1973 | Connely, Jr. | 52/8 |
| 3,823,492 | A | * | 7/1974 | Allain | 434/170 |
| 4,345,902 | A | * | 8/1982 | Hengel | 434/170 |
| 4,846,691 | A | * | 7/1989 | Acosta | 434/259 |
| 5,145,377 | A | * | 9/1992 | Tarvin et al. | 434/219 |
| 5,927,987 | A | * | 7/1999 | Berman | 434/107 |
| 6,057,501 | A | * | 5/2000 | Hale | 84/470 R |
| 6,604,947 | B1 | * | 8/2003 | Rai | 434/170 |
| 6,669,486 | B2 | * | 12/2003 | Frankenbery et al. | 434/404 |
| 6,685,477 | B1 | * | 2/2004 | Goldman et al. | 434/172 |

* cited by examiner

Primary Examiner—Kurt Fernstrom
(74) Attorney, Agent, or Firm—Weingarten, Schurgin, Gagnebin & Lebovici LLP

(57) ABSTRACT

The method uses vehicles as mascots for different subject areas. Each vehicle is named after a subject area and is decorated. The vehicles serve as a means to generate enthusiasm for the subject areas. Each car has its own color combination corresponding to a given subject. Each subject area has an instructor that is knowledgeable in that subject. The instructors wear clothing colored to match the color of the vehicle named after the subject area that he/she teaches. The instructors teach the pre-planned lessons on a topic in a subject. area. The pre-planned lessons also incorporate supporting information from other subject areas to the topics. The instructors drive the vehicles to sites of instruction where students are located to perform a pre-planned lesson on a topic. The sites of instruction have or utilize concepts that will be used in the pre-planned lesson. In the presentation of the lesson, an instructor uses teaching materials colored to match the color of the vehicle that he/she drives.

18 Claims, 1 Drawing Sheet

METHOD FOR EDUCATING CHILDREN

CROSS-REFERENCE TO RELATED APPLICATIONS

This application is entitled to the benefit of Provisional Patent Application Ser. No. 60/162,415 filed Oct. 27, 1999 and is a continuation of patent application Ser. No. 09/694,920 filed Oct. 24, 2000 now abandoned.

BACKGROUND OF THE INVENTION

This invention relates to education, specifically to a method of teaching children.

This invention addresses the following problems:

Some children have a low motivation to learn.

Other children cannot visualize the concepts they read in books.

Certain features and concepts that are taught cannot be recreated in classroom environments.

Although there is a trend to integrate subject areas to fully address topics, many teaching resources do not do this as much as they could. This leads to additional planning for the teachers. The teachers then have to figure what subject areas need to be incorporated, how to incorporate supplemental information from other subject areas, and how to show children which information came from which subject area.

Elementary school teachers are usually not skilled in any one discipline but have a general knowledge of all subjects.

BRIEF SUMMARY OF THE INVENTION

The invented method uses vehicles as mascots for subject areas. Each vehicle is named after a subject area by incorporating the name of the subject area as part of the name of the vehicle. Each subject area vehicle is decorated and has its own color combination. The vehicles serve as a means to generate enthusiasm for the subject areas. An instructor that is knowledgeable in the subject area is provided for each vehicle. The instructor wears clothing colored to match the vehicle of that subject he/she teaches. Instructors drive the vehicles to sites of instruction where students are located to perform a pre-planned lesson. The sites of instruction have or utilize concepts that are taught in the lesson. The instructor brings the needed teaching materials in the vehicle. The teaching materials are also colored to match the vehicle. The teaching materials are incorporated into the lesson at the appropriate points. Repeating the specific color combinations of the vehicle in the instructor's clothing and teaching materials accomplishes the following:

Emphasizes certain points in the lesson.

Teaches children to recognize and classify information by subject and visually shows how information from different subject areas is integrated to fully address a topic.

An audio/visual recording is made of the lesson for students who could not be at the site of instruction.

Objects and Advantages

The objects and advantages of the invented method are that it generates enthusiasm for the subject area, teaches concepts by having students experience real-world situations, helps students to learn through the use of color-coding, uses a skilled instructor to teach each subject, and teaches classification and integration of subject areas visually. This method is useful for visual learners or people who learn primarily through sight. Other objects and advantages will become apparent after reading the following description.

DESCRIPTION OF THE DRAWING

These and other features of the invention are more fully exemplified in the following detailed description and the accompanying drawing which shows in FIG. 1 a flow chart of the method of the invention.

DETAILED DESCRIPTION OF THE INVENTION

Figure 1:
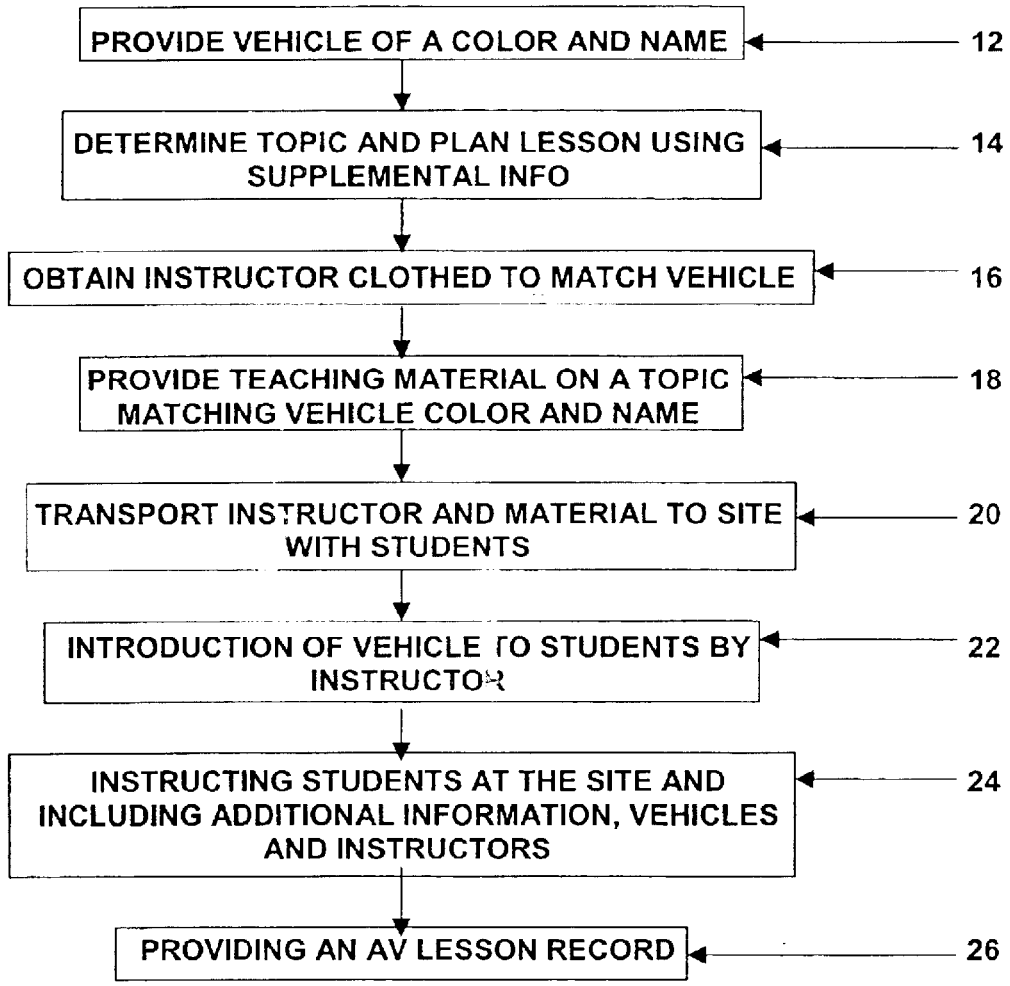

Vehicles need to be provided. The vehicles are used as mascots for each subject area. They are used to generate enthusiasm for the subject. The vehicles are each named after a subject area. The names of the vehicles are the Science Bug, History Bug, Reading Bug and Math Bug. The Science Bug, History Bug, Reading Bug and Math Bug are bug-shaped cars that are decorated with various size magnetic spots and have big bug-like antennae attached to the front of the car. Each car is made to look like a giant bug. (The Science Bug, History Bug, Reading Bug and Math Bug may also be referred to as the bug cars.) The spots are removable magnets and are cut from a sheet of magnetic material. They are placed randomly on the metallic parts of the car. The antennae are made of PVC pipe and have lacrosse balls mounted on the end of the PVC pipe. The antennae are mounted by opening the hood of the car and sticking the antennae between the hood and the windshield. The spots and antennae are painted the same color, but the color varies form car to car as does the body colors of the cars. The coloring is as follows:

Science Bug—Green bug-shaped car with black spots and black antennae;

History Bug—Dark blue bug-shaped car with orange spots and orange antennae;

The Reading Bug—Yellow bug-shaped car with blue spots and blue antennae; and

The Math Bug—Silver bug-shaped car with red spots and red antennae.

The Science Bug, History Bug, Reading Bug and Math Bug are the basic bug cars used in this method but other bug cars named after other subjects such as but not limited to the Biology Bug, Astronomy Bug, Engineering Bug, Chemistry Bug, Oceanography Bug, Meteorology Bug: Hydrology Bug, Botany Bug, Zoology Bug, and Physics Bug may also be used. Each of the other bug cars will be decorated with spots and antennae and have its own unique color combination.

Each of these bug cars is provided with an instructor that is skilled or knowledgeable in that subject area. The instructor is there to teach the pre-planned lesson on a specific topic. This lesson can present the topic in any logical fashion. The instructor's clothing matches the color combination of that instructor's bug car for that particular subject. The instructor's clothing for science will be colored green and black. The instructor's clothing for history will be colored dark blue and orange. The instructor's clothing for reading will be colored yellow and blue. The instructor's clothing for math will be colored silver and red.

The instructor drives the bug car of that subject to the site of the instruction where the students are located. The site of instruction may be an area having or utilizing concepts related to the lesson the instructor will teach. The instructor brings all the needed teaching materials in the bug car. The teaching materials are also colored to match the color combination of the bug car. The instructor exits the bug car and introduces the name of the bug car to the students. The introduction provides subject recognition. Next, the instructor teaches the lesson on a specific topic incorporating the matching colored teaching materials. The lesson can be presented a variety of ways as long as the teaching materials are used.

Having teaching material colored to match the bug car and instructor's clothing emphasizes certain points in the lessons and serves as a means for the students to make the connection between the material being taught and the subject heading of that material or in other words classification. An example of this would be if the buoyant force is being taught at a pool, a green ball with black spots is used to help make the connection that this is a science topic because the ball is the same color as the Science Bug. A green poster with black lettering is used to convey the secret of floatation is another teaching material that uses the same colors as the Science Bug. The instructor that drives the Science Bug would wear a green shirt and black shorts. The use of green and black throughout the lesson would be related to the colors of the Science Bug and hence to the subject area science.

In some lessons when more than one bug car and instructor with teaching materials is used to present the lesson, students receive a visual representation of how information is not only classified but also integrated. For example, if the lesson being taught is about electricity, the Science Bug and science instructor would start teaching the lesson at an electricity generating plant. To introduce that there was not always the convenience of electricity to produce light in homes, the history instructor would drive the History Bug to the plant and add this historical information to the lesson. The history instructor brings dark blue and orange candles (teaching materials) that matched the color the History bug to illustrate this point. The Reading Bug would be driven to the site of instruction by the reading instructor to introduce what books could be read that relate to electricity. The books would be pulled from the yellow bag with blue spots to match the color of the Reading Bug. All instructors would wear clothing that match the bug car that they drove. Depending on which instructor is talking, students can then relate this information to the subject area again through the use of the instructor's clothing colors matching that of the bug car he or she uses. This lesson shows how the subject areas of science, history and reading are visually integrated to fully address the topic of electricity by relating the repetition of color to the bug car of that subject area.

In some instances, the Science Bug, History Bug, Reading Bug and Math Bug have voices and are able to give the instructor and students answers to questions or other additional information relating to the topic being taught. The voices of the bug cars would be done by hiding a person inside the car with a microphone.

Last an audio/visual recording is made for students who could not be at the site of the instruction. The Method of Educating Children uses the Science Bug, History Bug, Reading Bug and Math Bug in combination with color-coding instructor's clothes and teaching materials to:

Generate enthusiasm for the lesson;

Emphasize key lesson points;

Show how information from different subject areas is classified; and

Show how information from different subject areas is integrated to fully address and understand the material being taught.

This method is useful for visual learners or people who learn primarily through sight. This method has been written in general terms so that it can be applied to teach almost any topic.

The preferred embodiment of this method is to use bug-shaped cars decorated to look like giant bugs, use two colors per bug-shaped car, and use the subject area followed by the word bug to name the vehicles. Many other variations of this specification exist such as changes in the way the vehicles are decorated (use abstract designs or make the cars look like cats), changes in the type of vehicles, changes in the name of the vehicle (example, the Science Mobile or Chemistry Car), changes in how the vehicle is named, changes in the materials used to make the vehicles look like bugs, changes in the subject area other than the ones already stated, changes in what is colored like the vehicles, and/or changes in the coloring of the vehicles and repeating those changes in the clothing of the instructor and the teaching materials.

The method of the invention is further illustrated in FIG. 1 wherein in step 12 a vehicle of a designated color and name such as one of the colors and names described above is used. In a subsequent step 14 a topic for instruction is planned in coordination with the vehicle and supplemental information, additional vehicles and teachers, as noted above and below. In step 16 an instructor is scheduled to teach the lesson and is clothed in a color matching the vehicle color. In step 28 teaching material is provided on a topic and in a color matching the vehicle color and name. In step 20 the instructor is transported in the vehicle of the given name and color to the site where students have been assembled for the lessons where the instructor, in step 22, is introduced to the students in the presence of the vehicle of coordinated color and name. In step 24 the students are given the actual instruction on the topic in conjunction with the supplemental information and additional instructors and vehicles, if any, while an audio/visual record is made of the lesson for subsequent use.

What is claimed is:

1. A method for teaching children comprising providing a commercially available vehicle having an exterior of uniform and having, said name related to one of several educational subject areas;

said vehicle having indicia selectively applied on said exterior providing a unique appearance to said vehicle;

selecting an educational topic within said subject area of said vehicle name to be taught;

planning a lesson on said topic; providing one or more instructors to teach said topic;

said one or more instructors wearing clothing of a color substantially similar to said uniform color of said vehicle;

providing teaching materials that have a portion of said teaching materials colored to match said uniform color of said vehicle;

utilizing said vehicle to transport said one or more instructors and said teaching materials to an instruction site where students are present;

introducing said name of said vehicle to said students by said instructor;

instructing said students on said topic by said instructor utilizing said teaching materials;

whereby said lesson is taught by introducing said vehicle with said vehicle name related to said subject area and with similar colors for said vehicle, said clothing of said one or more instructors, and said certain portions of said teaching materials throughout said lesson;

whereby said students are provided with a visual means to recognize, classify and integrate information from said subject areas by the use of said colors.

2. The method of claim 1 wherein said step of providing a vehicle comprises providing a dome-shaped vehicle.

3. The method of claim 1 wherein step of selecting a topic includes the step of selecting from the group consisting of science, history, reading, and math.

4. The method of claim 1 wherein said vehicle providing step includes the step of associating the name Science Bug therewith with said exterior uniform color green with black spots and with black antennae.

5. The method of claim 1 wherein said vehicle providing step includes the step of associating the name History Bug therewith with said exterior uniform color dark blue with orange spots and with orange antennae.

6. The method of claim 1 wherein said vehicle is for reading and said vehicle providing step includes the step of associating the name Reading Bug therewith with said exterior uniform color yellow with blue spots and with blue antennae.

7. The method of claim 1 wherein said vehicle is for math and said vehicle providing step includes the step of associating the name Math Bug therewith with said exterior uniform color silver with red spots and with red antennae.

8. The method of claim 4 wherein the color of said teaching materials is green and black.

9. The method of claim 5 including providing the color of said teaching materials as dark blue and orange.

10. The method of claim 6 including providing the color of said teaching materials as yellow and blue.

11. The method of claim 7 including providing the color of said teaching materials as silver and red.

12. The method of claim 8 including the step of providing the color of said one or more instructor's clothing as green and black.

13. The method of claim 9 including the step of providing the color of said one or more instructor's clothing as dark blue and orange.

14. The method of claim 10 including the step of providing the color of said one or more instructor's clothing as yellow and blue.

15. The method of claim 11 including the step of providing the color of said one or more instructor's clothing as silver and red.

16. The method of claim 1 further includes the step of providing said teaching materials and additional teaching materials from other ones of said subject areas.

17. The method of claim 1 further including the step of providing an audiovisual record of said lesson to students who are not at said instruction site.

18. The method of claim 3 wherein said group further consists of biology, astronomy, engineering, chemistry, oceanography, meteorology, hydrology, botany, zoology and physics.

* * * * *

UNITED STATES PATENT AND TRADEMARK OFFICE
CERTIFICATE OF CORRECTION

| | | |
|---|---|---|
| PATENT NO. | : 6,814,579 B2 | |
| APPLICATION NO. | : 10/679142 | |
| DATED | : November 9, 2004 | |
| INVENTOR(S) | : Kim Suzanne Bent | |

It is certified that error appears in the above-identified patent and that said Letters Patent is hereby corrected as shown below:

Title page, Abstract (57), line 10, "subject. area." should read --subject area.--;

Title page, Abstract (57), line 11, "areas to the topics" should read --areas to fully address the topics--; and Column 4, line 38, "uniform and having," should read --uniform color applied thereto and having a name associated therewith,--.

Signed and Sealed this

Twenty-fifth Day of July, 2006

JON W. DUDAS
*Director of the United States Patent and Trademark Office*